United States Patent [19]

Muehldorf

[11] 3,787,669

[45] Jan. 22, 1974

[54] TEST PATTERN GENERATOR

[75] Inventor: Eugen Igor Muehldorf, Potomac, Md.

[73] Assignee: International Business Machines Corporation, Armonk, N.Y.

[22] Filed: June 30, 1972

[21] Appl. No.: 267,875

[52] U.S. Cl. .................................. 235/152, 235/197

[51] Int. Cl. .............................................. G06f 1/02

[58] Field of Search..... 235/152, 156, 197, 153 AC; 340/347 DD; 179/15 AV; 324/73 AT

[56] References Cited

UNITED STATES PATENTS

| | | | |
|---|---|---|---|
| 3,594,560 | 7/1971 | Stanley | 340/347 DD |
| 3,651,315 | 3/1972 | Collins | 235/153 AC |
| 3,636,443 | 1/1972 | Singh et al. | 235/153 AC |
| 3,631,229 | 12/1971 | Bens et al. | 235/153 AC |

OTHER PUBLICATIONS

Legnard et al., "Pattern Generating System," IBM Tech. Disclosure Bulletin, Vol. 14, No. 2, July 1971, pgs. 482–484.

*Primary Examiner*—Malcolm A. Morrison
*Assistant Examiner*—James F. Gottman
*Attorney, Agent, or Firm*—John E. Hoel

[57] ABSTRACT

A generic sequential digital pattern generator is disclosed for converting a serial data stream of *n* compacted pattern messages into a sequence of *n* parallel digital patterns. The generic invention comprises a decoding means connected to a serial data stream, for receiving a compacted pattern message and converting the message to a signal on one out of *r* decode lines, an output register having *r* binary storage cells connected to *r* output lines, and *r* modulo 2 adders in parallel. Each modulo 2 adder has an augend input and an addend input. Each augend input is connected to one decode line from the decoding means. Each addend input is connected to one input line from the register. When the decoding means receives a compacted pattern message, it executes a change in the binary state of a selected one of the *r* output lines. Two species of the invention are disclosed, a first digital pattern generator operating on a serial data stream of pattern messages compacted by a $\log_2 r$ encoding scheme, and a second digital pattern generator operating on a serial data stream of pattern messages compacted by the Shannon-Fano encoding scheme.

7 Claims, 13 Drawing Figures

LOG$_2$ r DECODER / PATTERN GENERATOR

SHANNON-FANO DECODER/PATTERN GENERATOR

TEST PATTERN GENERATOR

FIELD OF THE INVENTION

The invention disclosed herein relates to digital test equipment and more particularly to the field of large scale integrated circuit device testing.

DESCRIPTION OF THE PRIOR ART

Test pattern generators for functionally testing large scale integrated logic circuits having $r$ test points, have heretofor required $r$ information bits to be transmitted to the generator via the input channel for each change in the resulting test pattern. FIG. 1 illustrates one prior art test pattern generating system wherein the input channel 2 connecting the test data source 4 to the test pattern generator 6 has $r$ parallel address lines, each of which must deliver an information bit to the generator 6 each time the resulting test pattern is to be changed. FIG. 2 illustrates another prior art test pattern generating system wherein the input channel 12 connecting test data source 14 to test pattern generator 16, comprises a single signal line which carries $r$ information bits in serial fashion for each change in the resulting test pattern.

The test pattern data source is usually a general purpose computer which processes the designers testing instructions and converts them into machine language instructions for generating a test pattern. These instructions are then transmitted over an input channel to a test pattern generator which is a separate piece of hardware located at the test site.

Large scale integrated logic circuits presently have on the order of 30–40 input/output contacts per chip and in the near future the number of contacts should increase to on the order of 100 per chip. In functionally testing an LSI logic circuit, each I/O contact must be sequentially addressed and exercised and the resulting logical output must be tested for conformity with the desired logic function to be performed. Sequential testing of this nature requires repeated changes in the pattern of signals applied to the test points on the chip and the amount of data which must be transferred from the test data source to the chip under test becomes extremely large.

The prior art approach to transferring test data from the test data source to the test pattern generator is not sufficiently efficient for the high speed high volume information requirements demanded by future LSI logic circuit testing.

OBJECTS OF THE INVENTION

It is an object of the invention to reduce the number of information bits which must be transferred from the test data source to the test pattern generator in LSI circuit testing, to fewer bits than required in the prior art.

It is another object of the invention to convert a compacted, serial, input data stream of messages in Shannon-Fano Code to a parallel output data stream of bit patterns, in an improved manner.

SUMMARY OF THE INVENTION

A generic sequential digital pattern generator is disclosed for converting a serial data stream of $n$ compacted pattern messages into a sequence of n parallel digital patterns. The generic digital pattern generator comprises a decoding means connected to the serial data stream, for receiving a compacted pattern message and converting the message to a signal on one out of $r$ decode lines, an output register having $r$ binary storage cells connected to $r$ output lines, and $r$ modulo 2 adders in parallel. Each modulo 2 adder has an augend input and an addend input. Each augend input is connected to one decode line from the decoding means. Each addend input is connected to one output line from the register. When the decoding means receives a compacted pattern message, the modulo 2 adder executes a change in the binary state of a selected one of said $r$ output lines. A first species of the invention is a sequential digital pattern generator operating on a serial data stream of pattern messages compacted by a $\log_2 r$ encoding scheme. The $\log_2 r$ pattern generator comprises a first register for storing an initial test pattern, a second register for storing the location of a digit to be changed in the initial test pattern, means to decode the second register and to change the selected binary digit in the first register so as to generate the next test pattern, to be executed. A second species of the invention is a sequential digital pattern generator operating on a data stream of pattern messages compacted in the Shannon-Fano Code. The Shannon-Fano Code pattern generator comprises a register for storing an initial test pattern, means connected to the register to change a selected binary digit so as to generate a next test pattern and a tree decoder. The tree decoder has a plurality of nodal stages, each stage having a signal gate at each of a plurality of nodes, with predetermined ones of the gates connected to the register changing means, a counter connected to the tree decoder for counting the number of bits arriving in the input data stream and for sequentially connecting successive nodal stages in the tree decoder to the serial data stream. A means is connected to the counter and the tree decoder for generating a reset signal after a selected one of the predetermined ones of the gates in the tree decoder, has decoded a predefined compacted pattern message and has caused the register change means to alter a selected bit in the register.

Figure 9:
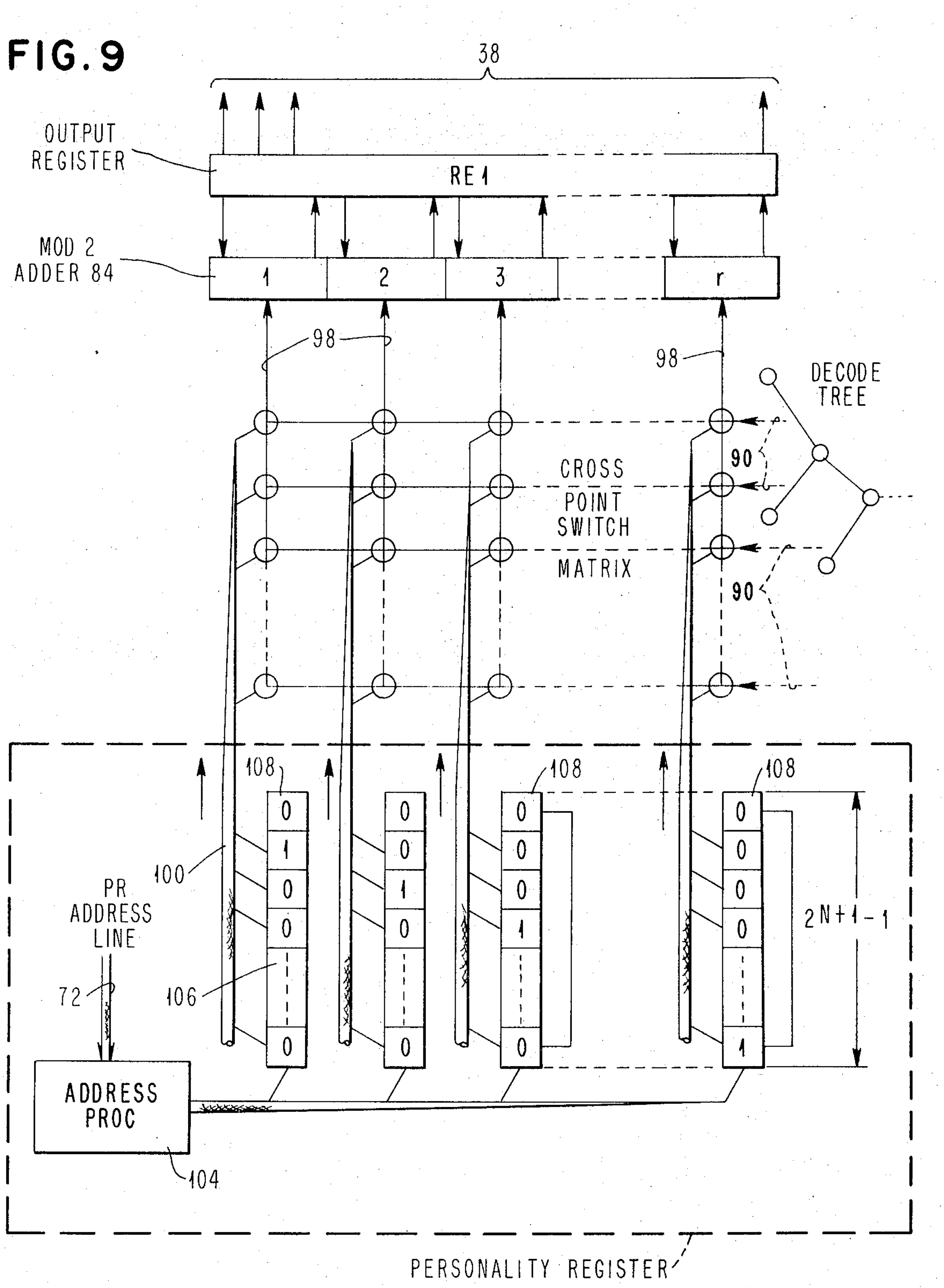

FIG. 9 gives a more detailed illustration of the personality register for the Shannon-Fano decoder/pattern generator.

Figure 10:
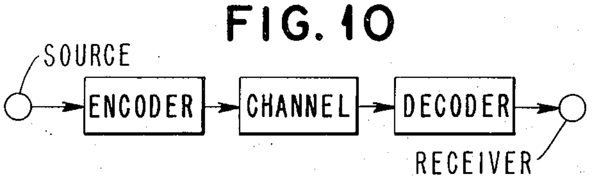

FIG. 10 is a simplified model of a communication system.

Figure 11:
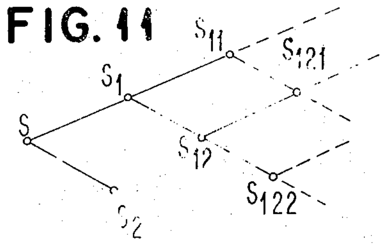

FIG. 11 illustrates a generalized binary code tree.

Figure 12:
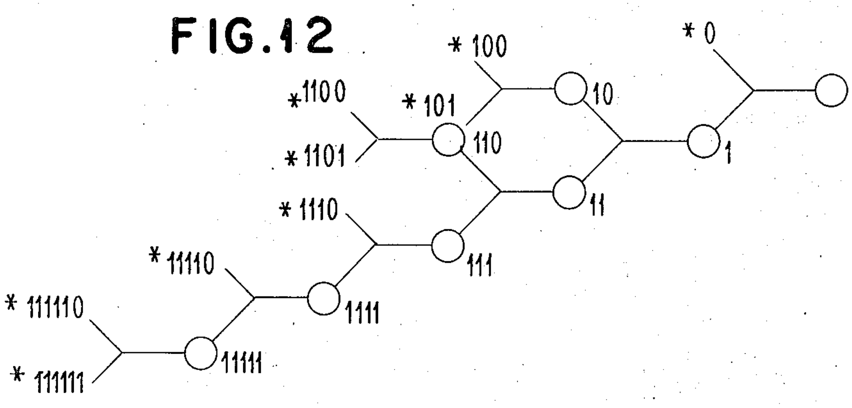

FIG. 12 illustrates the binary tree constructed by the successive subdivision of the message set of Table 1 into equi-probable subsets.

Figure 13:
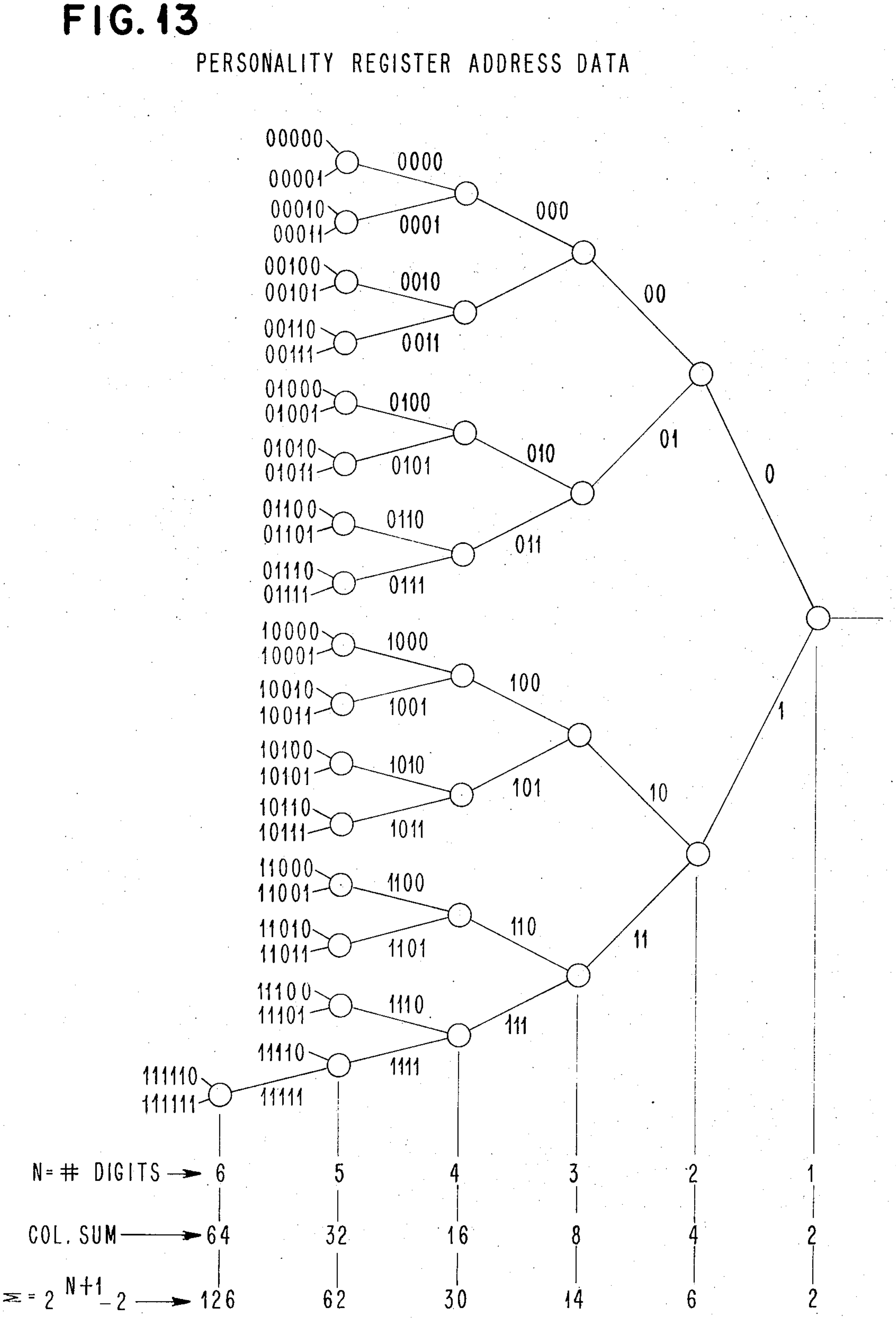

FIG. 13 illustrates the addressing scheme for the personality register address message.

DISCUSSION OF THE PREFERRED EMBODIMENT

Figure 3:
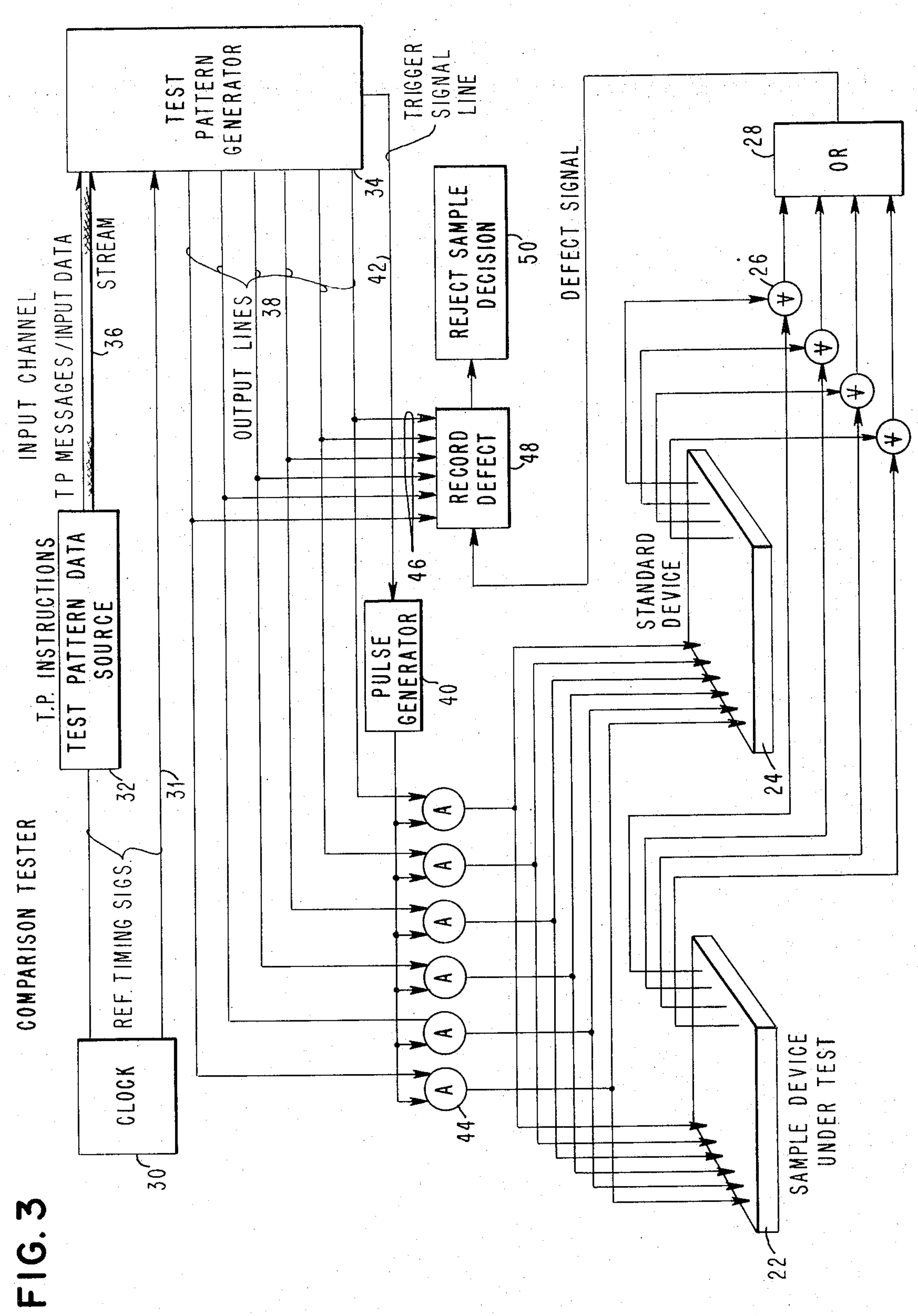
FIG. 3 illustrates a comparison type testing system for applying functional tests to large scale integrated logic circuit devices.

Functional testing tests the functional behavior of a digital integrated circuit by applying a sequence of input words at nominal voltage levels and checking the corresponding output words. Functional testing usually involves a large number of tests and is therefore performed at a high speed. A digital IC responds to a combination of high and low inputs (1s and 0s) by producing a certain combination of high and low outputs. Functional testing assures that the primitive logic blocks (ANDs, ORs, etc.) inside the IC can be switched. A comparison type tester is shown in the diagram of FIG. 3. Here a binary pattern is applied to the sample device under test 22 and at the same time to a standard device 24 having the same truth table as device 22. The outputs are compared by means of the exclusive OR's 26 and a defect signal is generated from OR 28 when the outputs differ. The comparison tester comprises a clock 30 which generates reference timing signals for test pattern data source 32 and the test pattern generator 34. The test pattern data source 32 may be a general purpose computer which processes test pattern instructions provided by the designer and generates the test pattern message which comprise the input data stream which is transmitted over the input channel 36 to the test pattern generator 34. The test pattern generator 34 generates a sequence of gating pulse over output lines 38. The gate pulses serve to connect selective test points on the sample device 22 and the standard device 24 to the signal pulse generator 40. When a set of gating pulses are generated on putput lines 38, a trigger signal is generated by the test pattern generator on line 42 which triggers the signal pulse generator 40. The gating pulses on output lines 38 open selected ones of the AND gates 44 and the signal pulse from signal pulse generator 40 is conducted to the desired input test points on sample device 22 and standard device 24 respectively. If the output signal pattern from sample device 22 is not identical to the output signal pattern from standard device 24, the exclusive OR gates 26 corresponding to the output line will propagate a defect signial through the OR gate 28 to the defect recorder 48. The defect recorder 48 records the pattern of gating pulses on output lines 38 which reveal the defective logical function in sample device 22, and then a sample rejection decision is made by the decision means 50. The designer has established acceptance criteria for sample devices under test and has entered these criteria as machine instructions into the decision means 50. If the acceptance criteria are met the testing will proceed to termination and the device will be deemed to have passed its functional testing. If the acceptance criteria are not met, the decision means 50 will generate a reject signal, the sample device 22 under test will be removed from the test station, the next sample device will be indexed and the functional testing sequence will be restarted.

Other types of test system configurations can be employed. For example, instead of making direct use of the standard device 24 to generate the correct output patterns, the output patterns can be simulated from a stored data base and indeed, the test pattern generator may itself, store the correct output patterns.

$\text{Log}_2\ r$ Decoder/Pattern Generator

The $\log_2 r$ decoder/pattern generator is one species of a generic sequential digital pattern generator for converting a serial data stream of $n$ compacted pattern messages into a sequence of n parallel digital patterns. The generic invention comprises a decoding means connected to a serial data stream, for receiving a compacted pattern message and converting the message to a signal on one out of r decode lines, an output register having $r$ binary storage cells connected to r output lines, and $r$ modulo 2 adders in parallel. Each modulo 2 adder has an augend input and an addend input. Each augend input is connected to one decode line from the decoding means. Each addend input is connected to one output line from the register. When the decoding means receives a compacted pattern message, it executes a change in the binary state of a selected one of the $r$ output lines. In the $\log_2 r$ decoder/pattern generator species of the invention, the pattern generator operates on a serial data stream of pattern messages of uniform length compacted by a $\log_2 r$ encoding scheme.

Figure 1:
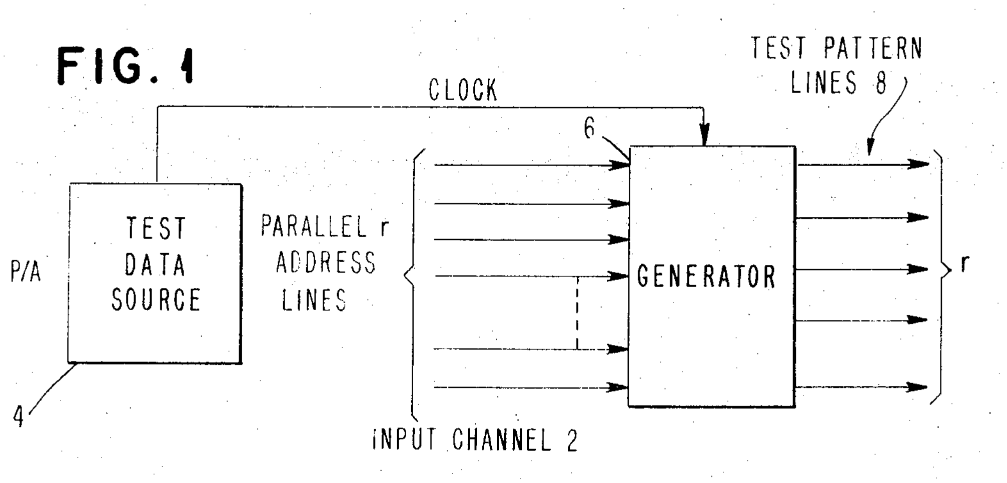
FIG. 1 illustrates one prior art test pattern generating system wherein the test pattern generator has $r$ parallel address lines, each of which must deliver an information bit to the generator each time the resulting test pattern is to be changed.
Figure 2:
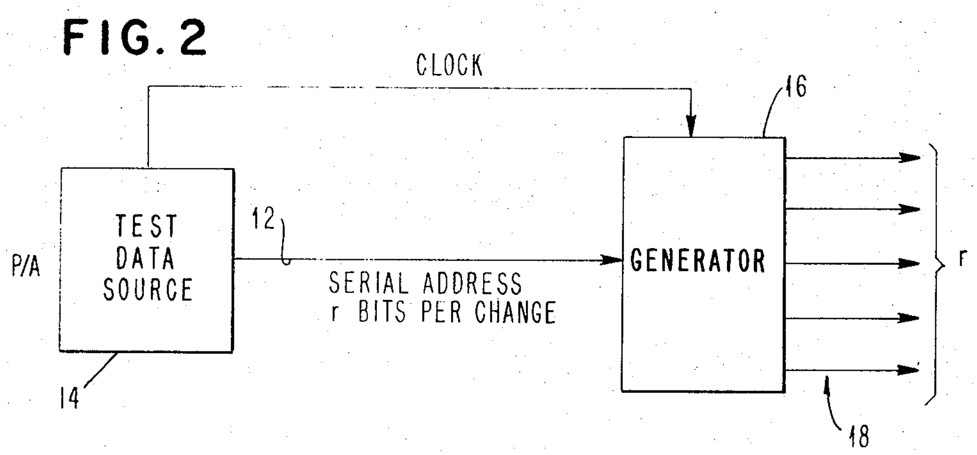
FIG. 2 illustrates another prior art test pattern generating system wherein the input channel comprises a single line which carries $r$ information bits in serial fashion for each change in the resulting test pattern.
Figure 4:
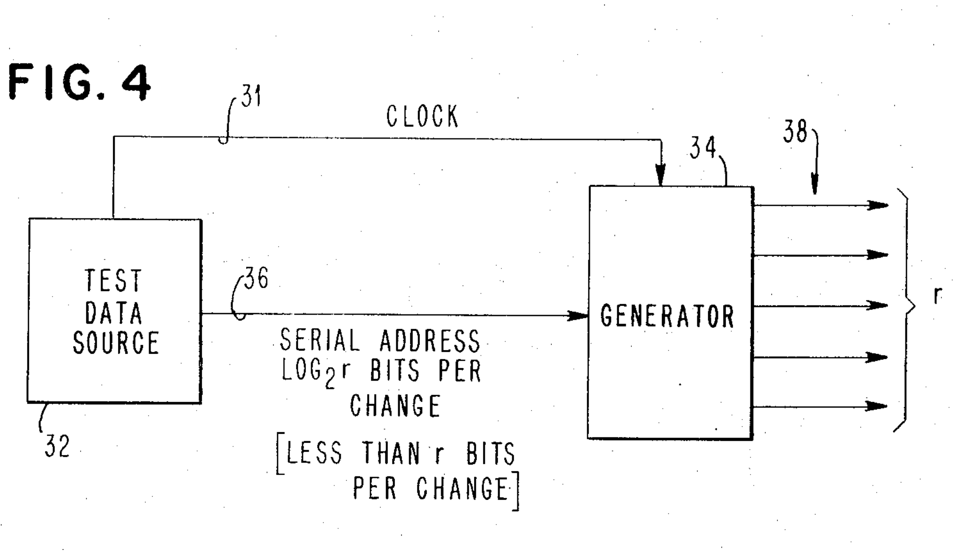
FIG. 4 schematically illustrates the $\log_2 r$ decoder/pattern generator which is the first species of the subject invention.
Figure 5:
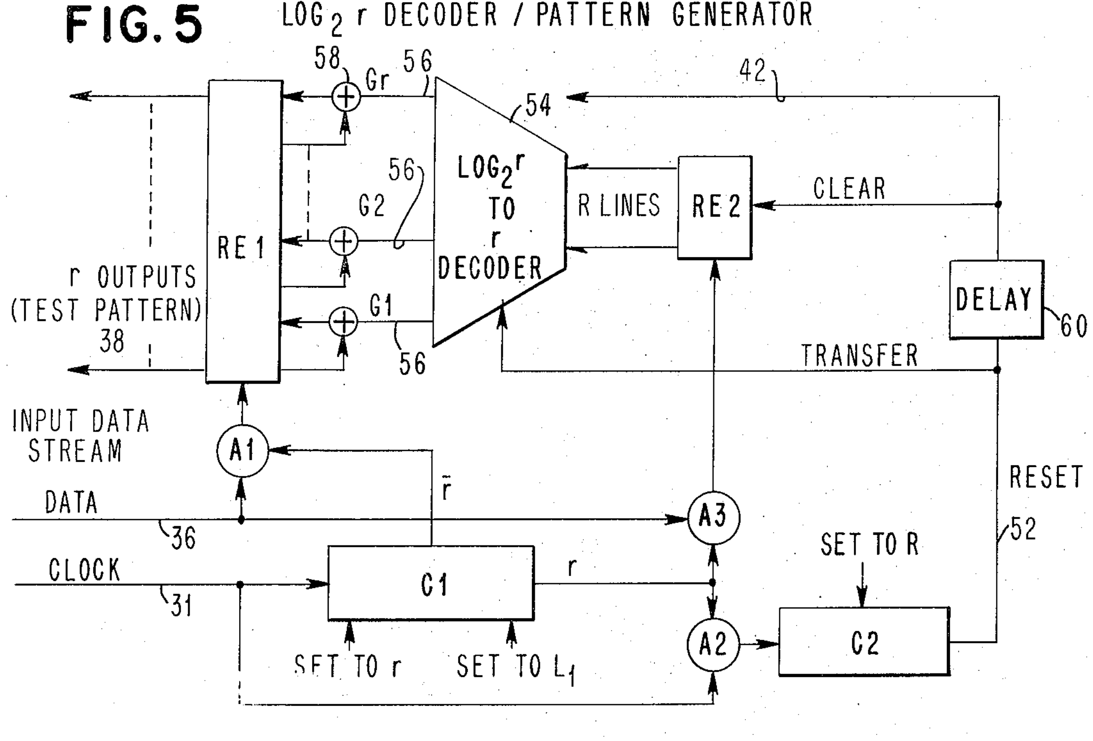
FIG. 5 depicts the hardware for the $\log_2 r$ decoder/pattern generator.

FIG. 4 schematically illustrates the $\log_2 r$ decoder/pattern generator. This first species of the subject invention reduces the number of information bits required to be transmitted over the input channel 36 to $\log_2 r$ information bits per change in the test pattern generated. The $\log_2 r$ bits are transmitted in serial fashion over a single transmission line. The serial array of the $\log_2 r$ bits are converted by the $\log_2 r$ decoder in the test pattern generator 34, into a parallel array of r bits on the output line 38. FIG. 5 depicts the hardware for the $\log_2 r$ decoder/pattern generator.

$\text{Log}_2\ r$ Encoding

In generating test patterns for complex sequential logic, it is important not to induce race conditions in parallel logic branches, which can lead to ambiguous output signal patterns. Race conditions may be easily avoided by limiting the change in the device input signal status to a single pin or test point per testing cycle. The rule of imposing no more than a single change per test cycle may be used to advantage in compacting the data in the test pattern data matrix. Table I shows the test pattern data matrix for a hypothetical LSI logic circuit having nine test points and requiring 101 testing cycles of a single change per cycle, for functionally testing the device. The on/off signal status for a given test point is represented as a binary number, by a zero or a 1. The matrix is constructed with each row representing the signal status for one test point, and each column represents the instantaneous signal status for all nine test points during the succeeding test cycles.

INSERT 1

TABLE I

| Test Pointer | | n Test Cycles (1–101) | $C_i$ | Log r Encoded Message | Shannon-Fano Encoded Message |
|---|---|---|---|---|---|
| 1 | A | 01100110011001100110011001100110011001100110011001100110011001100110011001100110011001100110011001101 | 51 | 0001 | 0 |
| 2 | B | 00111100001111000011110000111100001111000011110000111111111111111111111111111111111111111111111111111 | 13 | 0010 | 100 |
| 3 | C | 00000000000000000000000000000000000000000000000000000011110000111100001111000011001111000011110000111 | 13 | 0011 | 101 |
| 4 | D | 00001111111100000000111111110000000011111111000000001111111111111111111111111111111111111111111111111 | 7 | 0100 | 1100 |
| 5 | E | 00000000000000000000000000000000000000000000000000000000000011111111000000001111111100001111000011111 | 7 | 0101 | 1101 |
| 6 | F | 00000000111111111111111100000000000000001111111111111111000000000000000000000000000000000000000000000 | 4 | 0110 | 1110 |
| 7 | G | 00000000000000001111111111111111000000000000000000000000000000000000000000000000000000000000000000000 | 2 | 0111 | 11110 |
| 8 | H | 00000000000000000000000000000000000000000000000011111111111111110000000000000000000000000000000000000 | 2 | 1000 | 111110 |
| 9 | I | 00000000000000000000000000000000000000000000000000000000000000000000000011111111111111111111111111111 | 1 | 1001 | 111111 |

In examining each respective column in the test pattern data matrix of Table I, it is to be noted that the signal status will change for only one row from the instantaneous signal status depicted in the immediately preceeding column. Each status change is highlighted in the matrix by underlining the binary digits changed. The 101 by 9 bit matrix contains 909 bits and to transfer the test pattern information from the test pattern data source 32 to the test pattern generator 34 in the prior art, the input channel 36 has to carry the entire 909 bits to accomplish the functional testing of the device. One aspect of the $\log_2 r$ decoder/pattern generator is the compaction of the test pattern data in the test pattern data matrix of Table I, into a linear sequence of binary bits comprising the signal status word for the first test cycle and the sequence of $n-1$ bit change address words, where $n$ is the number of test cycles in the functional test to be executed. Each bit change address word is a binary number whose numerical value is equal to the number of the row in the test pattern data matrix which corresponds to the test point on the LSI device whose signal status is desired to be changed in the instant test cycle. Since there are r test points whose signal status will be changed at some time during the functional test of the device, each bit change address word will be composed of the same number of bits, which will be equal to the next integer larger than $\log_2 r$ and is labeled R. Applying to $\log_2 r$ data compaction scheme to the test pattern data matrix of Table I, the bit change address words for each of the nine rows in the matrix is displayed in the column labeled "$\log_2 r$ encoded message" of Table I. It is noted that each of the bit change address words is four binary bits in length. The value of R is the next integer larger than $\log_2 9$ which is equal to four. It is also to be noted that each of the bit change address words is a binary number whose numerical value is equal to the number of the corresponding row in the test pattern data matrix in Table II. Table II illustrates the linear sequence of binary bits which represent the 909 bits in the test pattern data matrix of Table I, as encoded by the $\log_2 r$ compaction scheme.

The first nine bits comprise the signal status word for the first test cycle. An examination of the first column in the test pattern data matrix of Table I shows that the signal status of all nine test points corresponds to the binary digit 0. There is, therefore, a sequence of nine zero digits in the signal status word for the first test cycle as shown in Table II. The test pattern data matrix of Table I has 101 columns and since the rule of a single change per test cycle is imposed on the matrix, there are 100 signal status changes contained therein. Each of these signal status changes is represented in the linear sequence of binary bits shown in Table II, by a four digit, bit change address word corresponding to the row to be changed in the test pattern data matrix. Thus, it is seen that there is a succession of 100 bit change address words, each four digits in length, appearing after the signal status word for the first test cycle, in the order of their execution for the function test to be performed. The general expression for the number of bits in the linear sequence is $r+(n-1)R$. In the present example the linear sequence of binary bits in the $\log_2 r$ compaction code, is 409 bits in length. This represents a factor of 2.2 reduction in the number of bits required to represent the test pattern data matrix of Table I. This

TABLE II

Log$_2$ r Encoded 409 bits
x2.2 reduction

DATA STREAM = r
000000000 ← signal status word for 1st test cycle log$_2$ r ↓ bit change address words

| | | | |
|---|---|---|---|
| 0001 | 0010 | 0001 | 0100 |
| 0001 | 0010 | 0001 | 0110 |
| 0001 | 0010 | 0001 | 0100 |
| 0001 | 0010 | 0001 | 0111 |
| 0001 | 0010 | 0001 | 0100 |
| 0001 | 0010 | 0001 | 0110 |
| 0001 | 0010 | 0001 | 0100 |
| 0001 | 0010 | 0001 | 0111 |
| 0001 | 0010 | 0001 | 0100 |
| 0001 | 0010 | 0001 | 0110 |
| 0001 | 0010 | 0001 | 0100 |
| 0001 | 0010 | 0001 | 1000 |
| 0001 | 0010 | 0001 | 0100 |
| 0001 | 0011 | 0001 | 0110 |
| 0001 | 0011 | 0001 | 0101 |
| 0001 | 0011 | 0001 | 1000 |
| 0001 | 0011 | 0001 | 0101 |
| 0001 | 0011 | 0001 | 1001 |
| 0001 | 0011 | 0001 | 0101 |
| 0001 | 0011 | 0001 | 0011 |
| 0001 | 0011 | 0001 | 0101 |
| 0001 | 0011 | 0001 | 0101 |
| 0001 | 0011 | 0001 | 0101 |
| 0001 | 0011 | 0001 | 0101 |
| 0001 | 0011 | 0001 | 0001 |

can be translated into a reduction in the transmission time of the factor of 2.2, for the transmission of the test pattern data over the input channel 36 from the test pattern data source 32 to the test pattern generator 34.

$Log_2$ *r* Decoder/Pattern Generator Hardware

FIG. 5 provides a detailed description of the $log_2$ *r* decoder/pattern generator hardware. Clock reference pulses from clock 30 are incident on the counter C1 over the clock line 31 and the input data stream from the test pattern data source 32 is incident on the AND gates A1 and A3 over the input channel 36. The counter C1 is adjustable and is set to produce an on condition for AND gate A1 during the first *r* clock pulses and to produce an off condition for AND gates A2 and A3 for the first *r* clock pulses. The input channel 36 delivers the $log_2$ *r* encoded linear sequence of binary bits in serial fashion, each data bit occuring simultaneously with a clock reference pulse on clock line 31. Thus, for the first *r* clock pulses on line 31, the AND gate A1 conducts the first *r* data bits to the column word register RE1. The column word register RE1 will store the instantaneous signal status word for each test cycle to be performed in the functional test of the device. Thus, the column word register RE1 will contain the signal status word for the first test cycle when the first *r* bits in the $log_2$ *r* encoded input data stream are received. When the $(r+1)$th clock reference pulse is received on clock line 31, the counter C1 turns the AND gate A1 off and turns on the AND gates A2 and A3. This action enables the counter C2 which commences to receive all clock pulses on clock line 31 after the first *r* clock pulses. The counter C2, which is adjustable, is set to produce an output after R clock reference pulses have been counter where R is the number of binary digits in each bit change address word in the $log_2$ *r* encoded input data stream. After the first *r* clock pulses have been received the AND gate A3 is opened and succeeding data bits in the input data stream are directed into the change address word register RE2. The change address register RE2 will store the bit change address word of R digits in length corresponding to each succeeding change to be executed in the instantaneous signal status for successive test cycles. The R storage cells in the change address register RE2 are connected by R lines to a binary to position decoder 54, which converts the numerical value of the bit change address word stored in the change address register RE2 into a signal state for one out of *r* decodelines 56 from the decoder 54. Each of the *r* decode lines 56 from the decoder 54 is incident on one of the *r* exclusive OR gates G1, G2,. . .Gr 58. A second input for each of the exclusive OR gates 58 comes from one of the *r* bit storage cells in the column word register RE1 which corresponds to one of the *r* decode lines 56 from the decoder 54. After R clock pulses have been counted in the counter C2, an output pulse is generated on line 52 which activates the binary to position decoder 54. The decoder generates a one bit for the one out of *r* decode lines 56 selected by decoder 54 after operating on the bit change address word stored in RE2. The decoder generates zero bits on the remaining $r-1$ decode lines 56. Each exclusive or gate 58 adds modulo 2, the contents of the bit position to which it is connected in the decoder 54, to the contents of the corresponding bit position in the column word register RE1. There results a single change in the bit position in the column word register RE1 corresponding to that one of the *r* decode lines 56 from the decoder 54 which has been selected to have a one bit signal state. The output signal from counter C2 also serves to clear the contents of the change word register RE2 and serves as a trigger signal passing over line 42 to the pulse generator 40. The instantaneous test pattern for the new test cycle is represented by the parallel array of binary bits on output lines 38 which is incident on the AND gates 44, selecting those test points on sample device 22 and standard device 24 which are to be connected to the pulse generator 40.

Operation of the $Log_2$ *r* Decoder/Pattern Generator

Applying the $log_2$ *r* decoder/pattern generator of FIG. 5 to the execution of the functional test represented by the test pattern data matrix of Table I, the counter C1 is set to $r=9$ and $L_1=409$ and the counter C2 set to $R=4$. The $log_2$ *r* encoded linear sequence of binary bits is transferred over the test pattern generator 34, in synchronism with the clock reference pulses transmitted over clock line 31 from clock 30. As the first nine clock reference pulses are counted in counter C1, the signal status word for the first test cycle is read into the column word register RE1. The 10th clock reference pulse incident on clock line 31 disables the AND gate A1 and enables the AND gates A2 and A3, thereby causing the counter C2 to commence counting the 10th and subsequent clock reference pulses. As the 10th through 13th clock reference pulses are counted, the instantaneous signal status for the first test cycle is available on output lines 38 for conditioning the AND gates 44 connecting the pulse generator 40 to the sample device 22 and the standard device 24. As the 10th through the 13th clock reference pulses are being counted in counter C2, the first bit change address word corresponding to the row number 1 in the test pattern data matrix of Table I, wherein the first change in binary bits is to take place, is entered into the change address register RE2. After 4 bits have been counted in the counter C2, the binary to position decoder 54 converts the numerical value of the bit change address word stored in register RE2 to a 1 bit on one of the *r* decode lines 56 from the decoder 54. The $r=1$ remaining decode lines 56 from the decoder 54 carry a 0 bit. The output pulse generated by counter C2 on line 52 serves to enable all of the exclusive OR gates G1, G2,. . .Gr 58 which will be at that point add modulo 2 the contents of each respective cell in the column word register RE1 to the binary value of the corresponding output line 56 from the decoder 54. The bit contents of each of these cells in column register RE1 which corresponds to one of the $r-1$ output lines 56 from decoder 54 which bears a 0 bit, will remain unchanged. The contents of that bit cell of column register RE1 which corresponds to that one output line 56 of the decoder 54 which bears a 1 bit, will have its binary value changed to 0, if a 1; if a 1, to a 0. Thus, for the first bit change address word in the $log_2$ *r* encoded linear sequence of binary bits of Table II, the binary number 0001 is entered into the change address register RE2, its numerical value is converted into a 1 bit being located on the output line 56 incident on the exclusive OR gate G1. When the transfer pulse from counter C2 enables the decoder 54, the exclusive OR gate G1 will add modulo 2 the 0 bit in the first binary bit cell in the column word register RE1 to the one bit on the decode line 56 connected to the exclusive OR gate G1 and then substitute the sum which is a one bit into the first binary bit cell in the column word register RE1. Thus, is the first change in the signal status effected to generate the instantaneous signal status on output lines 38 for the second test cycle in the functional test of the device. The output from counter C2 passes through delay means 60 and serves to clear the contents of the address word register RE2 and serves as the trigger signal transferred over line 42 to the pulse generator 40. During the succeeding four clock reference pulses, the instantaneous signal status will be available as the parallel array of binary bits on output lines 38, and when the signal pulse generator 40 is triggered, the signal status of test point number 1 on sample device 22 and standardized device 24, will have undergone the charge from the 0 state to the 1 state. Succeeding test cycles are generated by repeating the steps of counting R clock pulses in counter C2 while simultaneously entering R binary digits of the next bit change address word into the change address register RE2, decoding the numerical value of the bit change address word to select that one of the *r* decode lines 56 from decoder 54 which will bear a 1 bit and which will enable the corresponding exclusive OR gate 58 to change the contents of the corresponding binary bit cell in the column word register RE1.

The Shannon-Fano Decoder/Pattern Generator

The Shannon-Fano decoder/pattern generator is a second species of the generic sequential digital pattern generator for converting a serial data stream of *n* compacted pattern messages into a sequence of *n* parallel digital patterns. The generic invention, it is recalled, comprises a decoding means connected to a serial data stream, for receiving a compacted pattern message and converting the message to a signal on one out of *r* decode lines, an output register having *r* binary storage cells connected to r output lines, and *r* modulo 2 adder in parallel. Each modulo 2 adder has an augend input and an addend input. Each augend input is connected to one decode line from the decoding means. Each addend input is connected to one output line from the register. When the decoding means receives a compacted pattern message, it executes a change in the binary state of a selected one of the *r* output lines. In the Shannon-Fano decoder/pattern generator species of the invention, the pattern generator operates on a serial data stream of pattern messages of variable length, compacted by the Shannon-Fano encoding scheme.

Figure 6:
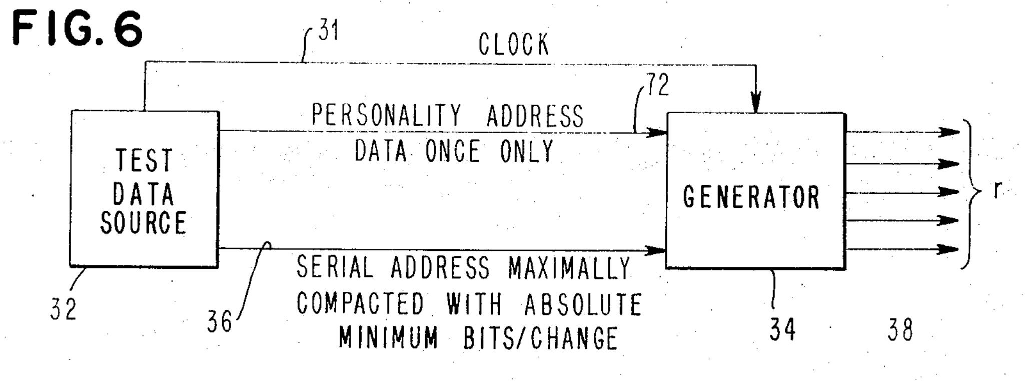
FIG. 6 schematically illustrates a testing system with the Shannon-Fano decoder/pattern generator.
Figure 7:
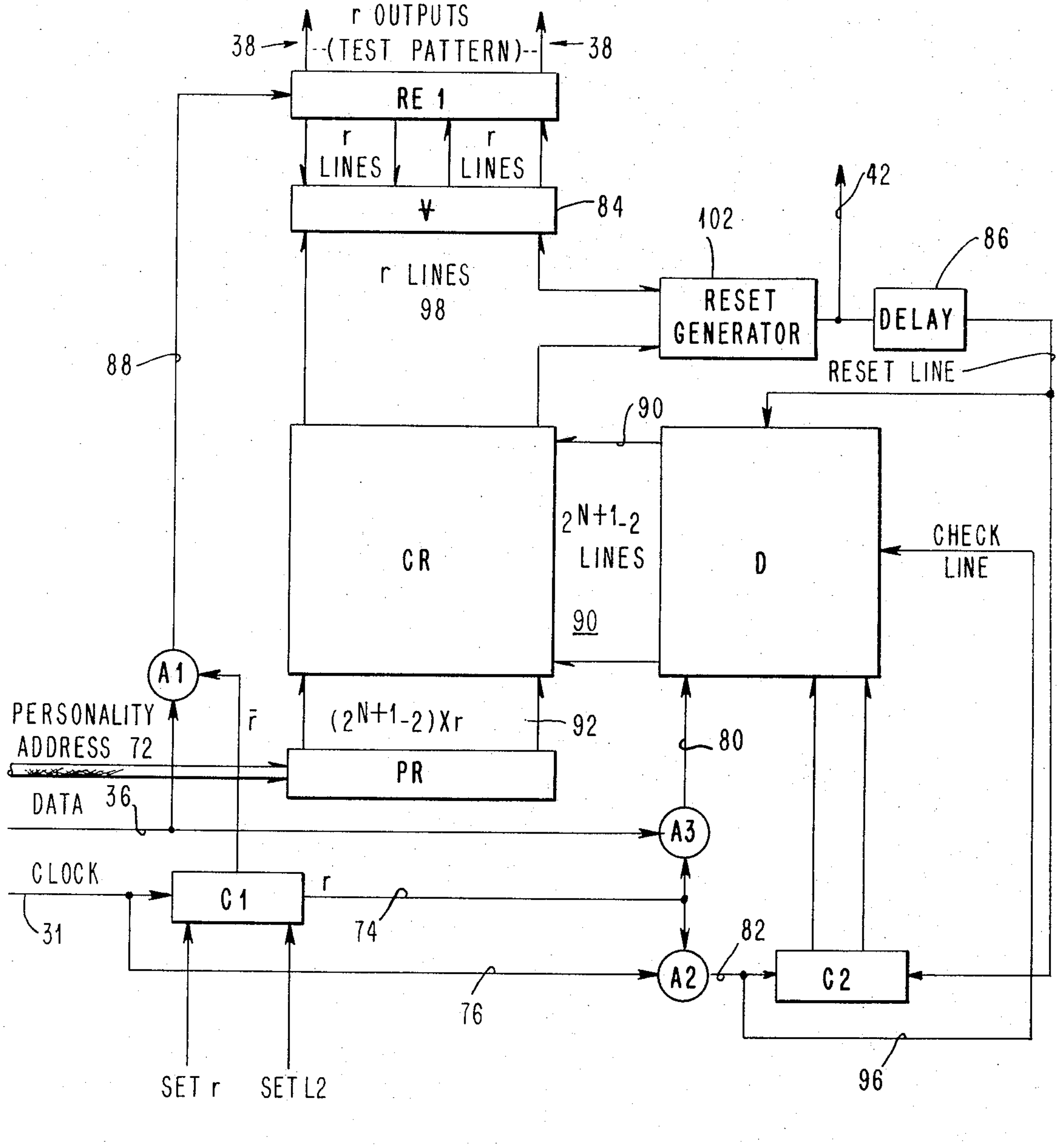
FIG. 7 depicts the hardware for the Shannon-Fano decoder/pattern generator.
Figure 8:
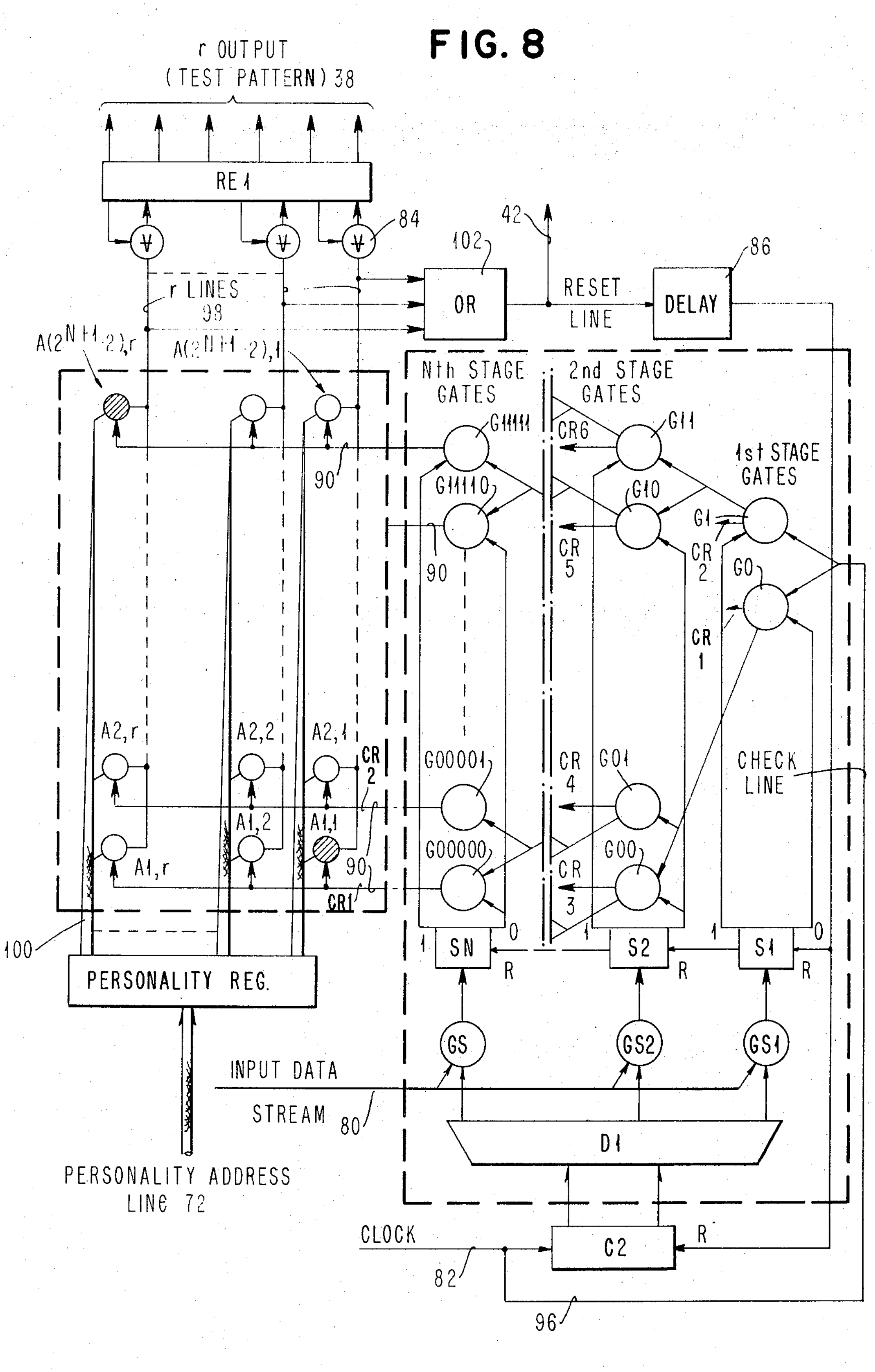
FIG. 8 gives a more detailed illustration of the tree decoder, the cross point switch, and the modulo 2 adder in the Shannon-Fano decoder/pattern generator.

FIG. 6 illustrates a test system with a Shannon-Fano Decoder/Pattern Generator. The test data source 32 transmits test pattern data over the input channel 36 to the test pattern generator 34, in synchronism with the clock reference pulses on clock line 31. Test pattern messages in the input data stream are maximally compacted by means of the Shannon-Fano compaction code. The Shannon-Fano decoder/pattern generator decodes the compacted messages in the data stream and generates a sequential parallel array of binary bits corresponding to the instantaneous signal status to be imposed on the device under test, appearing on the r output lines 38. A personality address is transmitted from the test data source 32 to the test pattern generator 34 over the personality address lines 72. The personality address is transmitted to the test pattern generator 34 prior to the commencement of the testing of the particular type of device with a particular type of function test. So long as the type of device under test is and so changed so long as the functional test being employed is not changed, no further information need be transmitted over the personality address line 72. FIGS. 7, 8 and 9 give a more detailed view of the hardware comprising the Shannon-Fano decoder/pattern generator.

Shannon-Fano Encoding

Encoding is a transformation procedure operating on an input signal prior to its entry into the communication channel, the main purpose being to improve the efficiency of the communication link. A simplified model of a communications system with an encoder-decoder is shown in FIG. 10. One of the basic elements of a communication set up is an independent source, that is a device that selects messages at random from the discrete message ensemble with prescribed probabilities.

$\{m_1, m_2, m_3, ..., m_n\}$ $p\,\{m_1\}, p\,\{m_2\}, p\,\{m_3\}, ...\, p\,\{m_n\}.$

For our purposes, we will assume that successive messages are selected independently, that is, that the source has no memory. The channel of communication deals with symbols from a specified list. This list is generally referred to as the alphabet of the communication language. The following is standard terminology for discussing a communication language.

A character is any individual member of the alphabet set. A message or word is a finite sequence of characters of the alphabet. The length of a word is the number of characters in the word. Encoding is a procedure for associating words constructed from a finite alphabet of a language with given word of another language in a one-to-one manner. Decoding is the inverse operation of assigning words of the second language corresponding to given words of the first language. Uniquely decipherable encoding or decoding is the operation in which the correspondance of all possible sequences of words between the two languages without spacing marks between the words is one-to-one.

Thus, encoding is a procedure for mapping a given set of messages, $[m_1, m_2, ..., m_n]$ onto a new set of encoded messages $[c_1, c_2, ..., c_n]$ so that the transformation is one-to-one. It is our purpose to improve the efficiency of the transmission of messages over the communication channel by means of encoding with a uniquely decipherable code.

When the uniquely decipherable property is the only constrain on the desired code, the following simple encoding procedure may be employed. Divide the message set S into two arbitrary but nonempty subsets $S_1$ and $S_2$.

$$[\underbrace{m_1, m_2, \ldots, m_k,}_{S_1}\ \underbrace{m_{k+1}, \ldots, m_n}_{S_2}]$$

Assign a zero to all messages in subset $S_1$ and a one to all messages in subset $S_2$. Now continue with the partitioning of subset $S_1$ into two subsets $S_{11}$ and $S_{12}$. All messages in $S_{11}$ will have codes starting with 00, those in $S_{12}$ will have codes starting with 01, and so on. The partitioning should continue as long as the subsets contain more than one message. The tree of FIG. 11 is an example of this partitioning process.

If the subset, for example $S_{12112}$, contains a single message, then the code 01001 is associated with the message. If subset $S_{21}$ contains a unique message, the associated code will be 10. It can be seen that these codes have a prefix property since no path leading to a vertex in FIG. 11 can be a subset of a longer path leading to another vertex. Thus, a word is derived by the addition of digits to shorter words. The encoded message is therefore uniquely decipherable. The partitioning of messages can be done in a variety of ways. But the efficiency of the code is of particular consideration here. For this reason, the partitioning is more conveniently done in the message probability space. For instance, if the probability of occurrence of a zero and a one in the encoded message is to be approximately equal, it is logical to successively partition the messages into two approximately equal subsets. The Shannon-Fano encoding method yields a uniquely decipherable code having the maximum degree of transmission efficiency.

Shannon-Fano encoding is directed toward constructing efficient, uniquely decipherable binary codes for sources without memory. Let [X] be the ensemble of the messages to be transmitted and [P] be their corresponding probabilities:

$$[X] = x_1, x_2, \ldots, x_n$$

$$[P] = p_1, p_2, \ldots, p_n$$

It is desired to associate a sequence $C_k$ of binary numbers of unspecified length $n$ to each message $x_k$ such that; first, no sequences of employed binary numbers $C_k$ can be obtained from each other by adding more binary terms of the shorter sequence (the prefix property); and second, the transmission of the encoded message is efficient, that is, one and zero appear independently and with approximately equal probability.

The first constraint eliminates any ambiguity in the receiving end and guarantees a one-to-one correspondence between any set of original messages and the corresponding set of encoding messages without the necessity of spacing or punctuation between the words (the prefix constraint). The second constraint insures the transmission of almost one bit of information per digit of the encoded messages. The Shannon-Fano encoding procedure will be illustrated by the example in Table III.

The messages are first written in order to nonincreasing probabilities. Then the message set is partitioned into the two most equi-probable subsets, $[X_1]$ and $[X_2]$. A zero is assigned to each message contained in one subset and a one to each of the remaining messages. The same procedure is repeated for subsets of $[X_1]$ and $[X_2]$; that is, $[X_1]$ will be partitioned in the two subsets $[X_{11}]$ and $[X_{12}]$. Now the code word corresponding to a message contained in $X_{11}$ will start with 00 and that corresponding to a message in $X_{12}$ will begin with 01. This procedure is continued until each subset contains only one message. Note that each digit one or zero in each partitioning of the probability space appears with more or less equal probability, independent of the previous or subsequent partitioning; therefore, the second requirement is also fulfilled. It can be shown that the efficiency of the transmission of the information employing the Shannon-Fano Code is 100 percent. The encoding procedure is therefore an optimum procedure for minimizing the average length of the messages.

TABLE III

| Messages | probabilities | Encoded Messages | Length | Partitions |
|---|---|---|---|---|
| $X_1$ | 0.2500 | 0 0 | 2 | $X_1$: $X_{11}$ |
| $X_2$ | 0.2500 | 0 1 | 2 | $X_1$: $X_{12}$ |
| $X_3$ | 0.1250 | 1 0 0 | 3 | $X_2$: $X_{21}$: $X_{211}$ |
| $X_4$ | 0.1250 | 1 0 1 | 3 | $X_2$: $X_{21}$: $X_{212}$ |
| $X_5$ | 0.0625 | 1 1 0 0 | 4 | $X_2$: $X_{22}$: $X_{221}$: $X_{2211}$ |
| $X_6$ | 0.0625 | 1 1 0 1 | 4 | $X_2$: $X_{22}$: $X_{221}$: $X_{2212}$ |
| $X_7$ | 0.0625 | 1 1 1 0 | 4 | $X_2$: $X_{22}$: $X_{222}$: $X_{2221}$ |
| $X_8$ | 0.0625 | 1 1 1 1 | 4 | $X_2$: $X_{22}$: $X_{222}$: $X_{2222}$ |
| | | Average Length | 2.75 | |

No other encoding procedure satisfying the above requirements can be found having a smaller average number of digits per encoded message. Proofs may be found in F. M. Reza, An Introduction to Information Theory, McGraw-Hill, New York, 1961.

The Shannon-Fano encoding method is applied to the test pattern data matrix of Table I, as follows. The compacted input data stream will be divided into a single status word for the first test cycle followed by a succession of bit change address words, the first denoting the row in the test pattern data matrix of Table I wherein the binary digit is to be changed for the next test cycle. In this respect, the arrangement of messages in the Shannon-Fano encoded compacted data stream is the same as that for the $\log_2 r$ encoded compacted data stream. The bit change address words in the Shannon-Fano encoded compacted data stream will differ from the bit change address words in the $\log_2 r$ encoded compacted data stream in that the length of a bit change address word will be a function of the number of times that word will occur in the data stream. Those bit change address words which occur most frequently, will be composed of the fewest number of bits. Those bit change address words which occur only rarely, will be composed of the largest number of bits. In this way, when the sequence of bit change address words are concatenated in the input data stream, the total length of the data stream will be minimum. It can be appreciated that since the bit change address words are not all composed of the same number of characters, the property of unique decipherability is essential so that the decoding operation which is to be performed by the test pattern generator, can be executed without the addition of punctuation between successive messages.

The rows in the test pattern data matrix of Table I are labeled in the order of nonincreasing frequencies of occurrence for changes in their respective binary bits. The number of such changes is designated $C_i$ and the corresponding value for each row in the test pattern data matrix is shown in the column labeled $C_i$ in Table I. It is noted that for the example chosen, the rows are already arranged in the order of nonincreasing frequencies of occurrence $C_i$. For example, data row 1 which corresponds to the test point 1 on the sample device 22 under test, has 51 changes in the value of the binary bits occurring therein. This corresponds to 51 changes in the signal status of test point number 1, on the sample device 22. Again it is noted that the test pattern data matrix is so constructed that the signal status of only one test point is changed from one test cycle to the next to avoid the ambiguity which results from inducing race conditions in the logic being tested. Since there are 101 test cycles in the test pattern data matrix, there can be no more than 100 signal status changes under the rule of a single change per test cycle. The sum of the frequencies of occurrence $C_i$ will equal 100 in this case. The data rows in the test pattern data matrix of Table I are considered the message set and the set partitioned into the two most equally probable subsets $[X_1]$ and $[X_2]$ as shown in Table IV.

Row 1 of the test pattern data matrix has a frequency of occurrence $C_1$ of 51 and the frequency of occurrence for rows 2 through 9 have a sum of the $C_i$ equal to 49. Thus, the message subset $[X_1]$ will contain only row 1 and the message subset $[X_2]$ will contain data rows 2 through 9 of the test pattern data matrix of Table I. A zero is assigned to each message contained in one subset and a one is assigned to each message contained in the other subset. Thus, the first character in the bit change address word for row 1 will be a 0 and the first character in the bit change address word for rows 2 through 9 will be a 1, as is shown in the column labeled Shannon-Fano encoded message, in Table I. The same procedure is repeated for subsets $[X_1]$ and $[X_2]$; that is, $[X_1]$ will be partitioned into two subsets $[X_{11}]$ and $[X_{12}]$. This procedure is continued until each subset contains only one message. Since the first subset $[X_1]$ contains only one message, the bit change address word for data row 1 of the test pattern data matrix in Table I will be the single character 0. The subset $[X_2]$ is now partitioned into two equi-probable subsets $[X_{21}]$ and $[X_{22}]$. The sum of the frequencies of occurrence for data rows 2 and 3 is 26 and the sums of the frequencies of occurrence for data rows 4 through 9 is 23. Thus, the message subset $[X_{21}]$ contains the data rows 2 and 3 and the second character in the bit change address word for each of these data rows is assigned as a zero. Message subset $[X_{22}]$ is composed of the data rows 4 through 9 and the second character in each bit change address word therein is assigned as 1. Message subset $[X_{211}]$ composed only of data row 2, and message subset $[X_{212}]$ which is composed of only data row 3. The third character in the bit change address word for the single data row contained in message subset $[X_{211}]$ is assigned as 0 and the third character in the bit change address word for the data row 3 in message subset $[X_{212}]$ is assigned as a 1. Continuing, the same procedure is repeated for subset $[X_{22}]$ until each subset contains only one message. The resulting encoded message set of a bit change address word for each of the nine data rows for the test pattern data matrix appear in the column labeled Shannon-Fano encoded message. The binary tree constructed by the preceding encoding method is shown in FIG. 12. An asterisk beside a binary number indicates that it is one of the uniquely decipherable messages to be employed in the code. It is to be noted that row number 1 in Table I containing the highest frequency of occurrence of bit changes $C_i$, has the bit change address word with the smallest number of characters and that correspondingly, data row number 9 having the lowest frequency of occurrence of bit changes in the test pattern data matrix, has a bit change address word with the largest number of characters. Also it is to be noted that no bit change address word may be derived from the addition of binary digits to another bit change address word having fewer characters. Thus, the encoded message set has the property of unique decipherability.

Table V illustrates the input data stream as encoded in the Shannon-Fano Code.

TABLE IV r=9 n=101

| | i | $c_i$ | $\frac{n-1}{c_i}$ | $\lceil \log_2 \left(\frac{n-1}{c_i}\right) \rceil$ Maximum length | Message | |
|---|---|---|---|---|---|---|
| 1 | A | 51 | $\frac{100}{51} = 1.9$ | 1 | 0 | $X_1$ |
| 2 | B | 13 | $\frac{100}{13} = 7$ | 3 | 100 | $X_{211}$ ] $X_{21}$ |
| 3 | C | 13 | $\frac{100}{13} = 7$ | 3 | 101 | $X_{212}$ ] $X_{21}$ |
| 4 | D | 7 | $\frac{100}{7} = 14$ | 4 | 1100 | $X_{2211}$ ] $X_{221}$ |
| 5 | E | 7 | $\frac{100}{7} = 14$ | 4 | 1101 | $X_{2212}$ ] $X_{221}$ |
| 6 | F | 4 | $\frac{100}{4} = 25$ | 5 | 1110 | $X_{2221}$ |
| 7 | G | 2 | $\frac{100}{2} = 50$ | 6 | 11110 | $X_{22221}$ |
| 8 | H | 2 | $\frac{100}{2} = 50$ | 6 | 111110 | $X_{222221}$ ] $X_{22222}$ |
| 9 | I | 1 | $\frac{100}{1} = 100$ | 7 | 111111 | $X_{222222}$ ] $X_{22222}$ |

$X_{21}$ and $X_{22}$ together form $X_2$ (rows 2–9); $X_{221}$ and $X_{222}$ form $X_{22}$ (rows 4–9); $X_{2221}$ and $X_{2222}$ form $X_{222}$ (rows 6–9); $X_{22221}$ and $X_{22222}$ form $X_{2222}$ (rows 7–9).

TABLE V

SHANNON-FANO ENCODED DATA STREAM 238 bits
x3.8 reduction r

000000000 ← signal status word for 1st test cycle

Shannon-Fano ↓ bit change address words

| | | | |
|---|---|---|---|
| 0 | 100 | 0 | 1100 |
| 0 | 100 | 0 | 1110 |
| 0 | 100 | 0 | 1100 |
| 0 | 100 | 0 | 11110 |
| 0 | 100 | 0 | 1100 |
| 0 | 100 | 0 | 1110 |
| 0 | 100 | 0 | 1100 |
| 0 | 100 | 0 | 11110 |
| 0 | 100 | 0 | 1100 |
| 0 | 100 | 0 | 1110 |
| 0 | 100 | 0 | 1100 |
| 0 | 100 | 0 | 111110 |
| 0 | 100 | 0 | 1100 |
| 0 | 101 | 0 | 1110 |
| 0 | 101 | 0 | 1101 |
| 0 | 101 | 0 | 111110 |
| 0 | 101 | 0 | 1101 |
| 0 | 101 | 0 | 111111 |
| 0 | 101 | 0 | 1101 |
| 0 | 101 | 0 | 101 |
| 0 | 101 | 0 | 1101 |
| 0 | 101 | 0 | 1101 |
| 0 | 101 | 0 | 1101 |
| 0 | 101 | 0 | 1101 |
| 0 | 101 | 0 | 0 |

The Shannon-Fano encoded compacted data stream comprises a first 9 bits which make up the signal status word for the first test cycle, in this case a succession of nine zeros. Following the signal status word for the first test cycle, a succession of 100 compacted bit changr address words are concatenated. The generalized expression for the number of bits in the *i*th bit change address word is $$\log_2 \frac{n-1}{c}$$

(the smallest integer not less than the logarithm). The total number of characters in the Shannon-Fano encoded compacted data stream is 238. This represents a factor of 3.8 reduction in the number of characters required to represent the test pattern data matrix of Table I. Correspondingly there is a factor of 3.8 reduction in the time required to transmit the test pattern messages over the input channel 36 from the test pattern data source 32 to the test pattern generator 34.

Shannon-Fano Decoder/Pattern Generator Hardware

Returning now to FIG. 7, the hardware for the Shannon-Fano decoder/pattern generator is illustrated in block diagram form. The overall operation of the Shannon-Fano decoder/pattern generator is similar to that for the $\log_2 r$ decoder/pattern generator. Each is a sequential digital pattern generator for converting a serial input data stream of *n* compacted pattern messages into a sequence of n parallel digital patterns. Each is comprised of a decoding means connected to the serial data stream, for receiving a compacted pattern message and converting the message to a signal on 1 out of *r* decode lines. Each has an output register having *r* binary storage cells connected to *r* output lines. And each has a modulo 2 adder having *r* bit-processing locations in parallel. Each bit-processing location having an augend input and an addend input, each augent input being connected to one decode line from the decoding means and each addend input being connected to one output line from said register. In each system, the introduction of a compacted pattern message executes a change in the binary state of a selected one of said r output lines. The Shannon-Fano decoder/pattern generator, however, differs from the $\log_2 r$ decoder pattern generator in that it has a tree decoder having a plurality of nodal stages, each stage having a signal gate at each of a plurality of nodes, with predetermined ones of said gates connected to the modulo 2 adder. In addition, there is a counter connected to the tree decoder for counting the number of bits arriving in the serial data stream and for sequentially connecting successive nodal stages in the tree decoder to the serial data stream. Also, there is a means connected to the counter and the tree decoder for generating a reset signal after a selected one of the predetermined ones of the gates in the tree decoder, has decoded a predefined test point address message and has caused the modulo 2 adder to alter a selected bit in the output register, thereby generating a sequential test pattern having a single change per test cycle. The characters in the test pattern messages being transmitted over the input channel 36 are transmitted simultaneously with clock reference pulses transmitted over clock line 31. The clock reference pulses on clock line 31 are incident on counter C1 in FIG. 7, which maintains the AND gate A1 in an on condition for the first *r* clock reference pulses. While the first *r* clock reference pulses are being counted, the first *r* characters in the test pattern message are being conducted from input channel 36 to the output register RE1, over line 88. The first *r* characters in the test pattern message make up the signal status word for the first test cycle to be executed in the functional test of sample device 22. While the first *r* clock reference pulses are being counted in counter C1, the counter maintains AND gates A2 and A3 in an off condition. After *r* clock reference pulses have been counted by counter C1, the counter places the AND gate A1 in the off condition and the AND gates A2 and A3 in the one condition, thereby shunting the input data stream from line 88 to line 80, and shunting the clock reference pulses from counter C1 t0 counter C2 over lines 76 and 82. The (*r*+1)th and succeding characters in the input data stream are directed into the decoder D under the control of the counter C2. After each clock reference pulse incident upon counter C2 on line 82 is counted, the decoder D executes a test to determine whether one of the uniquely decipherable bit change address words corresponding to a data row in the test pattern data matrix, has been received. This checking operation is executed in concert with the crosspoint switching matrix CR which has been encoded by the personality register PR to conform with the logic personality of the device under test and the characteristics of the functional test to be performed. If the decoder D and the crosspoint switching matrix CR determine that a uniquely decipherable bit change address word has been received on the input data stream, a signal will be placed on one out of *r* decode lines 98 from the crosspoint switch CR to the modulo 2 adder 84. The modulo 2 adder has *r* bit-processing locations in parallel. Each bit-processing location has an augend input and an addend input. Each augent input is connected to one decode line 94 from the crosspoint switching matrix point CR. Each added input is connected to one of the output lines 38 on the output register RE1. The modulo 2 adder 84 adds the signal on the selected decode line 94 to the binary digit stored in one out of *r* storage cells in the output storage register RE1. The sum modulo 2, is substituted for the addend in the one out of the *r* storage cells selected in the output register RE1. Thereby, a new parallel digital pattern of *r* bits is stored in the output storage register RE1 and is available on output lines 38 to the AND gates 44 in FIG. 3. Simultaneously with the appearance of the new bit pattern on output line 38, a trigger signal appears on line 42 which serves to trigger the signal pulse generator 40 which is connected by means of selected ones of said AND gates 44 to test points on the sample device 22 under test and the standard device 44. The duration present test cycle will continue and the gating pulses on output lines 38 remain available until the next uniquely deciperable bit change address word is detected by the decoder D and crosspoint switching matrix CR. At that time the next bit change is executed by means of the modulo 2 adder 84 in the output register RE1, corresponding to the next instantaneous signal status pattern on output lines 38.

The crosspoint switching matrix CR is connected to the decoder D by $2^{N+1}-2$ lines 90 and is connected to the personality register PR by $(2^{N+1}-2)r$ lines 92. The function of a crosspoint switch CR is to provide programmable connections from the nodal points in the tree decoder D to the decode lines 94 connecting the crosspoint switch CR to the modulo 2 adder 84. Because the decoder hardware is a general tree configuration, the connections in the crosspoint switch CR for a given set of program interconnections in the crosspoint switching matrix CR, will customize the test pattern generator for testing a particular type of logic device with a particular functional test. Thus, the selection of the set of programmed interconnections in the crosspoint switch matrix CR has two determinations;

a. the choice of which particular nodes of the tree decoder are to be connected to the modulo 2 adder. This is a function of the frequency of occurrence of the changes in the signal status to be applied to anyone test point on the type of device under test.

b. the consecutive order in which the *r* test points occur in the contact pin arrangement of the type of device under test.

FIG. 8 is a more detailed illustration of the decoder D, the crosspoint switching matrix CR and the modulo 2 adder 84. The decoder D comprises a subdecoder D1, which is a binary-to-position decoder whose input is connected to the counter C2, a tree decoder having N nodal stages. The subdecoder D1 has N output lines connected respectively to 1 out of N of the nodal stages in the tree decoder. Each nodal stage in the tree decoder has $2^N$ signal gates, one at each of a plurality of a nodes, where N is the number of the stage. The switching state of a stage is set by a nodal stage flip-flop, S. The flip-flop, S in turn is sequentially connected to the input data stream on line 80 by means of a gate GS and the subdecoder D1. Each of the nodal gates G is a two input AND gate. A first input derives from the flip-flop S contained in the nodal stage and the second input line is connected to the clock line 82 by means of the check line 96. When the gate GS is opened by the subdecoder D1 to admit one character from the input data stream, it sets the flip-flop S into either the zero or the one state. The zero output of the flip-flop S is connected to all even numbered nodal gates G in the associated nodal stage. The one output from the flip-flop S is connected to all odd numbered nodal gates G in the associated nodal stage. Sinultaneously with the setting of the flip-flop S, a clock reference pulse is transmitted over the check line 96 and forms the necessary second input signal to one of the $2^N$ nodal gates in the Nth nodal stage under consideration and thus satisfies the AND logical function of that gate. The selected gate is open and remains latched in the open state by means of the set condition of the flip-flop 8. The clock reference pulse is propagated through the selected open nodal gate G to the next nodal stage and also to the crosspoint switching matrix means of one of the connecting lines *cr* 90. There are $2^{N+1}-2$ nodal gates for the N nodal stages in the tree decoder, each nodal stage contaning $2^N$ nodal gates. Each nodal gate has a line cr which is connected to all crosspoint switching elements in a row of *r* crosspoint switching elements in the crosspoint switching matrix CR. There is a row of *r* crosspoint switching elements for each nodal gate in the decoding tree. There are $2^{N+1}-2$ rows of cross point switching elements. There is a total of $(2^{N+1}-2)$ *r* crosspoint switching elements in the crosspoint switching matrix CR. The crosspoint switching elements are arranged by columns, therebeing *r* columns, each crosspoint switching element in a given column being connected in common with one decode line 98. Thus, each column of crosspoint switching elements is connected to and associated with one out of the *r* decode lines 98 issuing from the crosspoint switching matrix. Each crosspoint switching element is a two input AND gate. One input of the gate is the *cr* line issuing from one of the nodal gates G in the decode tree. The other input line is a unique signal line issuing from the personality register PR. The personality register signal cables 100 are each composed of $2^{N+1}-2$ signal lines, each signal line being connected as the input to the respective crosspoint switching element. There are *r* personality register signal cables 100, each one r decode lines 98 issuing from crosspoint switch and connected to the modulo 2 adder 84. The enabled status of the crosspoint switching elements so programmed, is maintained for the duration of the employment of a particular functional test on a particular type of logical device.

The decoder D works in the following way. As the counter C2 counts, its binary output is decoded in the subdecoder D1 into a signal on one of N output lines to one out of the N gates GS. Simultaneously with the receipt of a clock reference pulse on clock line 82, a character is received from the input data stream on line 80. A first clock line reference pulse is decoded in subdecoder D1 and opens the gate GS1 in the first nodal stage and a first character in the bit change address word is read into flip-flop S1. It is is a zero, the first stage nodal gate G0 is opened and if it is a one, the first stage nodal gate G1 is opened. These nodal gates, as are all the other nodal gates in the decoder D, connect to the crosspoint switch CR by means of lines $cr_1$ and $cr_2$. Should the opening of either one of the nodal gates in the first nodal gates represent the receipt of a complete, uniquely decipherable bit change address word, then the clock reference pulse applied through the clock line 96 will propagate over line *cr* and through the programmed crosspoint switch to actuate the selected one out of *r* decode lines 98 in the modulo 2 adder 84.

If the setting of the nodal gate in the first nodal stage does not correspond to the receipt of a predefined, uniquely decipherable bit change address word, the counter C2 counts the next clock reference pulse and opens the gate GS2. The second character of the bit change address word in the input data stream is loaded into the flip-flop S2. This in turn opens two of the four nodal gates in the second nodal stage, nodal gates G00 and G10 if the character read in to flip-flop S2 is a zero or G10 and G11 if the character read into the flip-flop S2 is a one. Although two nodal gates are opened in the second nodal stage, only a single path will be available to propagate to the clock reference pulse through the tree from the previous nodal stage.

Again the decoder is checked via the check line 96 by means of propagating a clock reference pulse through the succession of opened nodal gates. If there are no programmed crosspoint switching element in the row CR connected in common with the last nodal gate opened in the tree decoder, the process of reading in successive characters from the bit change address word in the input data stream is repeated for the third through the Nth nodal stages, until a valid uniquely decipherable bit change address word is decoded.

When a uniquely decipherable bit change address word is detected and the selected one out of the *r* decode lines 98 bears a signal, the reset generator 102 generates a trigger signal on line 42 which serves to trigger the signal pulse generator 40. A reset signal is propagated through the tree decoder resetting the flip-flop S in each of the nodal stages and resetting the counter C2 to zero. The signal on the selected one out of *r* decode lines 98 is added modulo 2 to the contents of the corresponding storage cell in the output storage register RE1 and serves to change the instantaneous signal status pattern on the output lines 38 for the next test cycle in the functional test to be executed.

FIG. 9 is a detailed illustration of the personality register PR. Each one of the *r* personality register signal cables 100 is associated with a $2^{N+1}-1$ bit recirculating shift register 106. Each of the $2^{N+1}-2$ personality register signal lines in a particular personality register signal cable 100 is connected to one of the $2^{N+1}-2$ bit storage cells in its respective recirculating shift register 106. An extra storage cell 108 is contained in each recirculating shift register 106, which is not connected to a corresponding personality register signal line, and is called the dummy cell. A single one bit is stored in the register 106 and $2^{N+1}-2$ zero bits are stored in the register 106. The personality address line 72 is connected to the personality address processor 104. Each personality register address message is composed of two elements, the number *r* of the corresponding column of crosspoint switching elements to be addressed and the branch number *bn* of the portion of the check line 96 in the decode tree which is to be selected by the last nodal gate G to be actuated. The personality register address processor 104 selects the one out of *r* recirculating shift registers 106 corresponding to the value *r*. The personality register address processor 104 initializes the addressed shift register 106 by cycling the single one bit to the lowest order position in the register 106. The processor 104 then generates a number of clock pulses equal to the numerical value of the branch number *bn* and shifts the addressed shift register 106 as many times, thereby placing the single one bit stored therein in the selected storage cell within the shift register 106. The output from the selected storage cell in the shift register 106 serves as the enabling signal which is conducted along its corresponding personality register signal line in cable 100 to that one out of the $2^{N+1}-2$ crosspoint switching elements which is to be enabled in the column addressed in the crosspoint switching matrix CR. The corresponding one out of *r* decode lines 98 is thereby programmed to be connected to that nodal gate G in the tree decoder having the branch number *bn*. If the one of of *r* decode lines 98 addressed is not to be used in the functional test to be employed, the personality register address processor 104 will shift the one bit in the recirculating shift register 106 to the dummy cell 108, thus disabling the corresponding decode line 98. After the personality register address processor 104 has received all *r* personality register address messages, the crosspoint switching matrix CR is programmed for a particular functional test on any quantity of a logic device of a particular type.

OPERATION OF THE SHANNON-FANO DECODER/PATTERN GENERATOR

The operation of the Shannon-Fano decoder/pattern generator will be shown decoding the Shannon-Fano encoded compacted data stream of Table V representing th test pattern data matrix of Table I. FIG. 13 illustrates how the personality register address messages are formed. The branches of a decoding three are enumerated as shown. The first nodal stage contains one digit, the second nodal stage contains two digits, the Nth nodal stage contains N digits. The digits range in numerical value from zero to $2^N-1$ and are expressed in conventional binary notation. Table I shows the value *r* which is the number of the data row in the test pattern data matrix which corresponds to the test point on the device to be tested. For each test point *r* there is a corresponding Shannon-Fano encoded message shown in the column so entitled in Table I. There are nine test points and, therefore, there are nine personality address messages. The nine address messages shown in Table VI are transmitted over the personality address line 72 from the test data source 32 to the test pattern generator 34.

TABLE VI

Personality Address Words

P(r,$B_n$)

| | | |
|---|---|---|
| P(1,0) | P(2, 100) | P(3, 101) |
| P(4, 1100) | P(5, 1101) | P(6, 1110) |
| P(7, 11110) | P(8, 111110) | P(9, 111111) |

The test pattern generator is now programmed to execute the functional test represented by test pattern data matrix of Table I and the functional test may be performed on any number of the particular type of sample device 22 without further data input to the personality register PR.

The Shannon-Fano encoded compacted data stream is transmitted over the input channel 36 from the test pattern data source 32 to the test pattern generator 34. The first nine characters in the compacted data stream correspond to the signal status word for the first test cycle, and are entered into the output register RE1 under the control of counter C1. The data stream is then shunted to the decoder D for the 10th and succeeding characters in the compacted data stream. The 10th clock pulse is incident on counter C2 over line 82 and is decoded by subdecoder D1 into a signal opening the gate GS1. The 10th character in the input data stream is a zero and constitutes the bit change address word corresponding to the data row number 1 in the test pattern data matrix. The zero character is conducted gate GS1 and sets the flip-flop S1 to its zero output state. The zero output side of the flip-flop S1 is connected as one of the inputs to the nodal gate G0. The nodal gate G0 in the first nodeal stage is thus latched into the on stage by means of the flip-flop S1. The clock reference pulse on the check line 96 is propagated through gate G0 and is conducted along the line $cr_1$ to the row of crosspoint switching elements labeled $A_{1,1}$ to $A_{1,r}$. The crosspoint switching element $A_{1,1}$ has been programmed by the personality register PR to interconnect the nodal gate G0 with the first decode line of the $r$ decode lines 98. Therefore, the clock reference pulse propagated on the check line 96 through the nodal gate G0 and over the line $cr_1$ is propagated throught the crosspoint switching element $A_{1,1}$ and places a signal on the first decode line. Such signal is added modulo 2 to the contents of the first storage cell in output register RE1. The first storage cell in output register RE1 contains a zero for the first test cycle, corresponding to the instantaneous signal state on the corresponding test point of the sample device 22. The modulo 2 addition changes the contents of the first storage cell in output register RE1 to a one, thereby generating the instantaneous signal state for the second test cycle in the test pattern data matrix of Table I. The signal on the first decode line of the $r$ decode lines 98 causes the reset generator 102 to generate a trigger signal on line 42 for triggering the signal pulse generator 40. The first one out of nine AND gates 44 is enabled by the first one out of nine output lines 38, corresponding to the first storage cell in the outpt register RE1 containing one bit. The signal pulse generated by signal pulse generator 40 is therefore propagated through the selected AND gate 44 to the first test point to be addressed on the sample device 22 under test and to the standard device 24. A comparison test is executed by means of the exclusive OR gates 26 and any disparity in the logical output between sample device 22 and standard device 24 is recorded in the defect recorder 48 and a sample rejection decision is executed in decision means 50 of FIG. 3. The reset signal generated by reset generator 102 and delayed on delay means 86 serves to reset all of the flip-flops S1 to SN and to reset the counter C2 in preparation for the receipt of the next bit change address word in the input data stream. The operation is then repeated by successively decoding and identifying each uniquely decipherable bit change address word and generating each signal status change in the output register RE1, for each succeeding test cycle, until all 101 test cycles are executed for the functional test of the device, represented in the test pattern data matrix of Table I.

While the invention has been particularly shown and described with reference to the preferred embodiments thereof, it will be understood by those skilled in the art that the foregoing and other changes in form and detail may be made therein without departing from the spirit and scope of the invention.

What is claimed is:

1. A sequential digital pattern generator for converting a serial data stream of $n$ compacted pattern messages into a sequence of $n$ parallel digital patterns comprising:

a decoding means connected to said serial data stream, for receiving a compacted pattern message and converting said message to a signal on one out of $r$ decode lines, an output register having $r$ binary storage cells connected to $r$ output lines, $r$ modulo 2 adders in parallel, each adder having an augend input an an addend input, each augend input being connected to one decoding line from said decoding means and each addend input being connected to one output line from said register, whereby each compacted pattern message executes a change in the binary state of a selected one out of said $r$ output lines.

2. The sequential digital pattern generator for converting a serial data stream of $n$ compacted pattern messages into a sequence of $n$ parallel digital patterns of claim 1, wherein said decoding means comprises:

a second register for storing a number to the base $m$ whose numerical value corresponds to the selected one out of $r$ output lines to be changed, a base $m$ to position decoder connected to said second register for converting said stored number to the base $m$ to a signal on one out of $r$ decode lines.

3. The sequential digital pattern generator for converting a serial data stream of $n$ compacted pattern messages into a sequence of $n$ parallel digital patterns of claim 1, wherein said decoding means comprises:

a second register for storing a binary number whose numerical value corresponds to the selected one out of $r$ output lines to be changed, a binary to position decoder connected to said second register for converting said stored binary number to a signal on one out of $r$ decode line.

4. The sequential digital pattern generator for converting a serial data stream of $n$ compacted pattern messages into a sequence of $n$ parallel digital patterns of claim 1, wherein said decoding means comprises:

a tree decoder having a plurality of nodal stages, each stage having a single gate at each of a plurality of nodes, with predetermined ones of said gates connected to predetermined ones of said modulo 2 adders, a counter connected to said tree decoder for counting the number of information bits arriving in the serial data stream and for sequentially connecting successive nodal stages in said tree decoder to said serial data stream, means connected to said counter and to said tree decoder for generating a reset signal after a selected one of said predetermined ones of said gates in said tree decoder, has decoded a predefined compacted pattern message and has caused a selected one out of said $r$ modulo 2 adders to alter the binary state of a selected one out of the $r$ binary storage cells in said output register.

5. A sequential test pattern generator, comprising:

a first register for storing a first unit of binary data representing an initial test pattern, a second register for storing a second unit of data representing the location of a digit to be changed in said first unit of binary data.

means to decide said second unit of data and change the selected binary digit in said first unit of data, so as to generate a next pattern in said first register, means for signaling said decode means when said second unit of data has been received in said second register, so that said decode means can execute the selected change in said first unit of binary data, whereby a sequential test pattern is generated having a single change per test cycle.

6. A sequential test pattern generator operating on an input data stream of test point address messages compacted by the Shannon-Fano data compaction code, comprising:

a register for storing a first unit of binary data representing an initial test pattern, means connected to said register to change a selected binary digit in said first unit of binary data, so as to generate a next test pattern in said register, a tree decoder having a plurality of nodal stages, each stage having a signal gate at each of a plurality of nodes, with predetermined ones of said gates connected to said register changing means, a counter connected to said tree decoder for counting the number of bits arriving in the input data stream and for sequentially connecting successive nodal stages in said tree decoder to said input data stream, means connected to said counter and said tree decoder for generating a reset signal after a selected one of said predetermined ones of said gates in said tree decoder, has decoded a predefined test point address message and has caused said register change means to alter a selected bit in said register, whereby a sequential test pattern is generated having a single change per test cycle.

7. A method for converting a serial data stream of *n* compacted pattern messages into a sequence of *n* parallel digital patterns, comprising the steps of:

decoding each compacted pattern message into one out of *r* decode signals, adding modulo 2 said decode signal to the binary digit stored in one out of *r* storage cells in an output storage register, substituting the sum from said addition step for the addend in said one out of *r* storage cells, whereby a new parallel digit pattern of *r* bits will be stored in the output storage register.

* * * * *

PO-1050
(5/69)

UNITED STATES PATENT OFFICE
CERTIFICATE OF CORRECTION

Patent No. 3,787,669 Dated January 22, 1974

Inventor(s) EUGEN IGOR MUEHLDORF

It is certified that error appears in the above-identified patent and that said Letters Patent are hereby corrected as shown below:

In the Abstract, line 13, "input" second occurrence should read -- output --
Claim 4, column 28, line 42, "single" should read --signal--.
Claim 5, column 28, line 65, "decide" should read --decode--.
Claim 5, column 28, line 67, after the word "next" insert the word --test--.

Signed and sealed this 7th day of January 1975.

(SEAL)
Attest:

McCOY M. GIBSON JR.
Attesting Officer

C. MARSHALL DANN
Commissioner of Patents

WA9-71-010